June 30, 1970 L. J. NOWAK 3,517,908
VALVE
Filed March 20, 1968 2 Sheets-Sheet 2
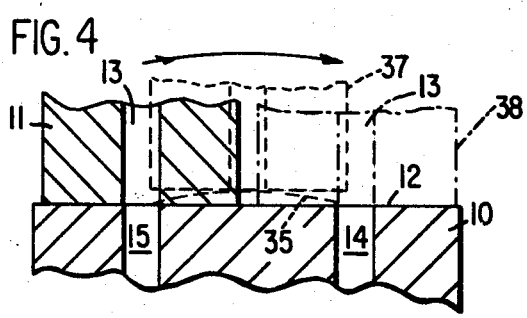
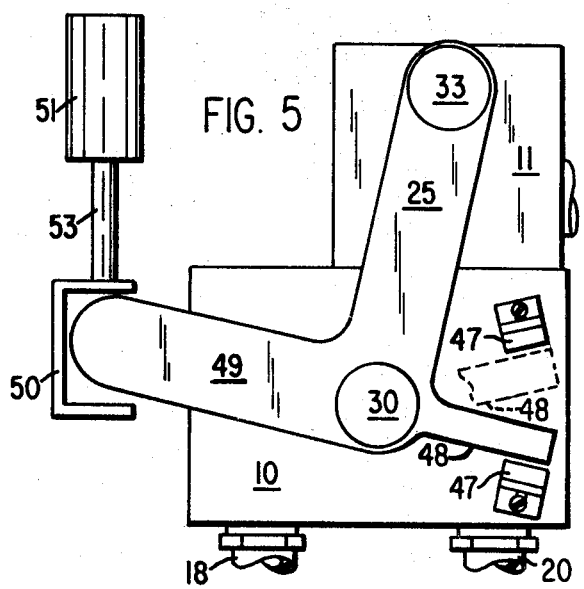
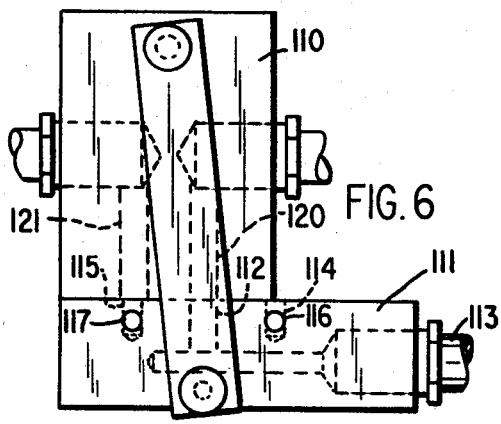
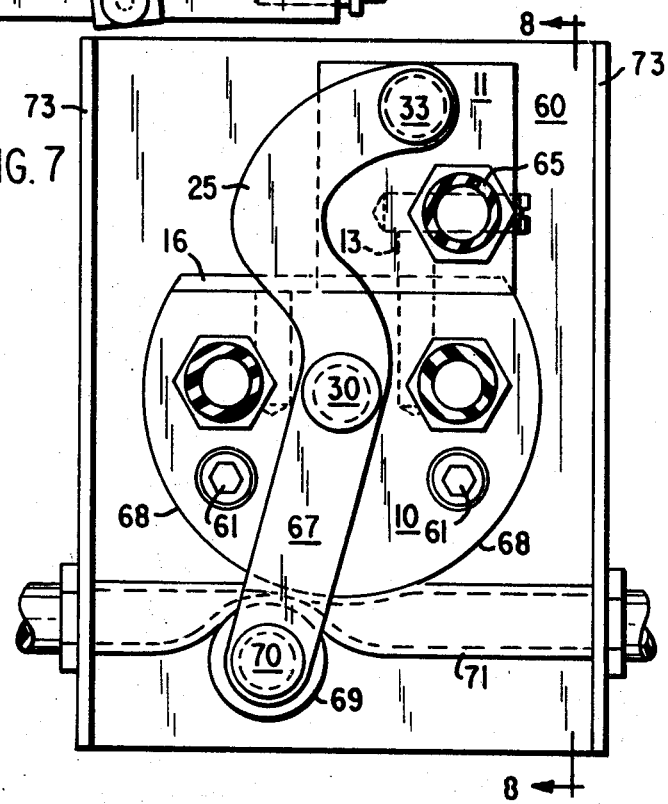
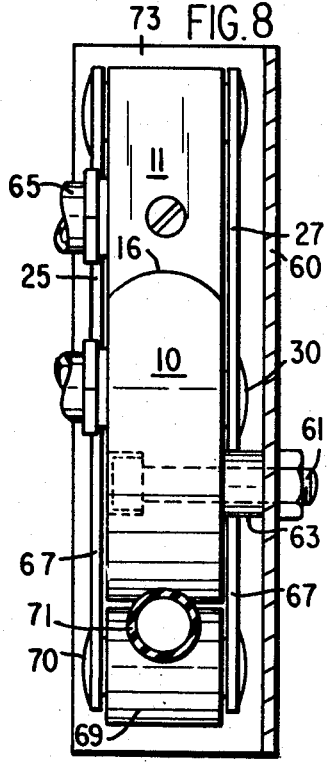
INVENTOR.
LEON J. NOWAK.
BY
D. Emmett Thompson
ATTORNEY.

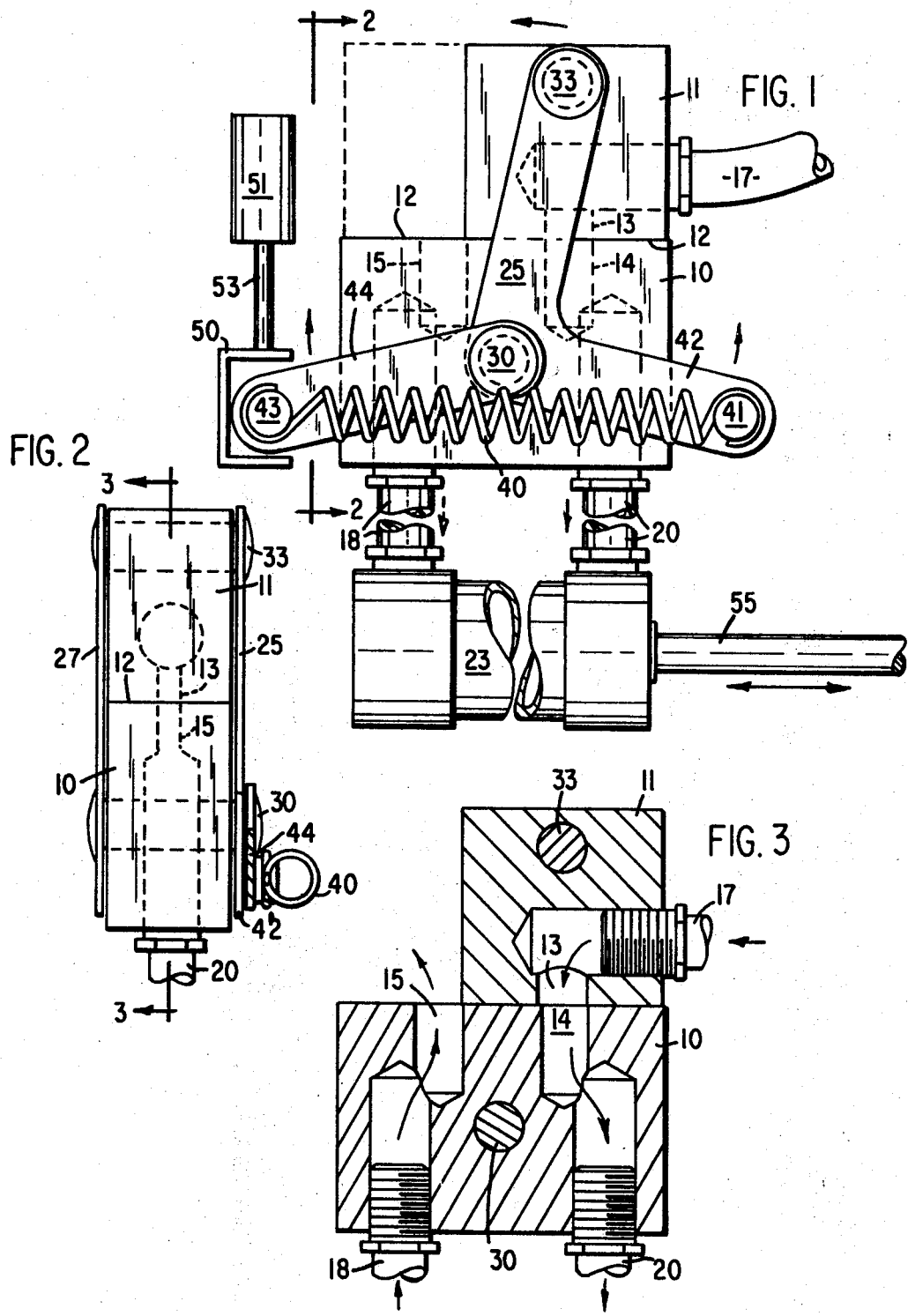

United States Patent Office 3,517,908
Patented June 30, 1970

3,517,908
VALVE
Leon J. Nowak, Liverpool, N.Y., assignor to Schroeder Machines Corporation, Syracuse, N.Y., a corporation of New York
Filed Mar. 20, 1968, Ser. No. 722,515
Int. Cl. F16k 25/00
U.S. Cl. 251—158          8 Claims

ABSTRACT OF THE DISCLOSURE

Two blocks are formed with confronting mating surfaces, each of which is provided with at least one port. Operating means is provided for imparting reciprocation to one block relative to the other. The arrangement is such that the confronting surface of the reciprocated block moves in an arcuate path over the confronting surface of the other block, and the surfaces are drawn in tight engagement at each end of the arcuate movement. During separation of the confronting surfaces at the intermediate portion of the arcuate movement, fluid is discharged from the ports, maintaining the surfaces clean.

BACKGROUND OF THE INVENTION

This invention has as an object a valve structure particularly useful in pressurized air circuits. Often valves in pneumatic circuits are operated continuously at high frequency for extended periods of time. Valves available for such use embody an expensive construction in order that the valve may have reasonable life expectancy.

My invention has as an object a valve formed of few parts, not requiring precision machining and which can be fabricated from conventional shapes, such as flat stock, and with substantially no waste of material, all whereby the valve can be constructed at nominal cost and the valve will function over long periods of use without maintenance.

BRIEF SUMMARY OF THE INVENTION

The valve embodying my invention consists basically of two metal blocks having confronting mating surfaces, the surface of each block being formed with at least one port. The valve structure includes operating means for imparting reciprocating motion to one block and during such movement, the confronting surface of one block travels in an arcuate path relative to the confronting surface of the other block.

The valve is economically constructed by connecting the blocks together by simple linkage pivotally connected to the blocks to provide such arcuate movement. The linkage connection is so laid out that at each end of the arcuate movement, the surfaces of the blocks are drawn together in tight sealing engagement. In the example referred to, at one end of the arcuate movement, with the blocks tightly engaged, the ports are in alignment. At the opposite end of the arcuate movement, the ports are not in alignment. During the intermediate portion of the arcuate movement, when the surfaces are separated, the air escapes from between the surfaces, whereby such surfaces are maintained free from any accumulation of foreign material.

BRIEF DESCRIPTION OF THE DRAWINGS

FIG. 1 is a side elevational view of a valve embodying my invention, the view including an actuator for the valve and a portion of a pneumatic system.

FIG. 2 is a view corresponding to line 2—2, FIG. 1.

FIG. 3 is a vertical sectional view taken on line 3—3, FIG. 2.

FIG. 4 is a sectional view of the area of the blocks contiguous to the plane between the confronting surfaces of the blocks and illustrating the arcuate movement of the movable block.

FIG. 5 is a view, similar to FIG. 1, illustrating a modified form of over-the-center mechanism.

FIG. 6 is a side elevational view of the blocks wherein one block is provided with three ports, and the other block is provided with two ports.

FIG. 7 is a view, similar to FIG. 1, showing the valve provided with a pneumatic actuator.

FIG. 8 is a view taken on line 8—8, FIG. 7.

DETAILED DESCRIPTION

Referring to FIG. 1, the valve proper consists of a pair of blocks 10, 11. The blocks are formed with confronting mating surfaces. In FIGS. 1-6, the confronting mating surfaces are flat planar surfaces, indicated by the line 12. However, the confronting surface of one block, as block 11, may be concave, and that of the other block 10, as indicated at 16, see FIGS. 7 and 8, convex, or the mating surfaces may be of V formation. The block 11 is formed with a port 13, and the block 10 is formed with ports 14, 15. The ports 13, 14, 15, opening through the confronting surfaces of the blocks. The port 13 is connected to a flexible conduit 17. The port 15 is connected to a conduit 18, and the port 14 is connected to a conduit 20. By way of illustrating an application of the valve, the conduits 18, 20, are connected to opposite ends of an air cylinder 23.

The blocks 10, 11, are connected together by links 25, 27, FIGS. 1 and 2, located at opposite sides of the pair of blocks. The link 25 is of bell crank form, and is pivotally mounted at the bight thereof to block 10 by a pin 30 extending through the block, and also forming the pivotal connection for the link 27 on the opposite side of the valve. The upper ends of the links 25, 27, are pivotally connected to the block 11 by a pin 33 extending through that block.

With this arrangement, the block 11 is shifted arcuately relative to the block 10. During this movement, which takes place about the axis of the pin 30, it will be apparent that the block 11 will move in an arcuate path, indicated at 35, FIG. 4. In this figure, the block 11 is shown with its port 13 in registration with the port 15—that is, the block 11, in FIG. 4, has been shifted to the left from the position shown in FIG. 1. The intermediate portion of the block 11 is shown in dotted outline at 37, FIG. 4, in which the confronting surface of the block 11 is elevated from the surface 12 of block 10. As the block 11 completes its arcuate movement, as indicated in dotted outline at 38, FIG. 4, the surface of the block is drawn tightly against the surface of the block 10 in sealing relation thereto, and port 13 is aligned with port 14.

Referring again to FIG. 1, a tension spring 40 is connected at one end to a pin 41 carried at the outer end of the leg 42 of link 25. The opposite end of the spring is connected to a pin 43 mounted in one end of a link 44, the opposite end of which is pivotally mounted on the pin 30. This arrangement provides an over-the-center mechanism. It will be apparent that when the free end of the link 44 is moved upwardly, FIG. 1, pin 43 will pass beyond the plane intersecting the axes of pins 30, 41, whereupon spring 40 will swing the arm 42 upwardly, and link 25 will effect movement of block 11 to the left. It will be apparent that spring 40 serves to effect rapid shifting of the block 11 and serves to yieldingly hold the block in shifted position at each end of the arcuate movement.

A modified over-the-center arrangement is shown in FIG. 5. In this arrangement, permanent magnets 47 are fixed to the block 10 and positioned so that the linkage is moved into the effective fields of the permanent magnets respectively at each end of the arcuate movement of the shiftable block. The magnets serve to effect movement of the linkage and blocks at high velocity and to yieldingly maintain the linkage and blocks in shifter position. As shown in FIG. 5, the link 25 is formed with integral arms 48, 49, extending radially from the pivot pin 30, the arm 48 being movable into and out of the effective field of the permanent magnets 47.

The linkages 25, 27, FIG. 5 may be actuated by any suitable mechanism depending upon the use to which the valve is put. For example, the free end of the link 44, or arm 49, may be engaged by a U-shaped actuator 50 mounted for reciprocation, as by cylinder 51 and piston rod 53, to which the actuator is attached. The arrangement may be such that the actuator 50 is connected to the piston rod 55 of cylinder 23, whereby the valve would function to effect continuous reciprocation of the piston rod 55 or, as will be obvious, the linkages may be actuated by a solenoid, or other means.

For example, in FIG. 7, the valve is provided with a form of fluid actuating mechanism. In this construction, the valve body 10 is mounted in a channel member 60, as by screws 61, the block 10 being positioned forwardly of the back wall of the channel member, as by spacers 63 mounted on the bolts 61. The block 11 is apertured at one side to receive a conduit coupling 65 communicating with the port 13. The upper portion of the link 25, extending between the pivot pins 30 and 33, is of arcuate formation to provide clearance for the conduit coupling 65 when the block 11 is shifted to the left. The links 25, 27, have portions 67 extending downwardly from the pivot pin 30. The lower portion, or side, of the block 10 is of arcuate form, as indicated at 68. The depending arms 67 of the links 25, 27, extend beyond the periphery of the curved surface 68, and there is a roller 69 journalled on a pin 70 between the links. A flexible conduit 71 extends through the side flanges 73 of the channel member 60 and is fixed thereto. The flexible conduit 71 extends between the depending arms 67 and between the curved surface 68 and roller 69. If pressure is applied to the left end of the conduit, FIG. 7, and pressure is released from the right end of the conduit, the roller 69 and the arms will be moved counter-clockwise to shift the block 11 to the left.

As the blocks are positioned in FIG. 1, fluid pressure is supplied from conduit 17, through ports 13, 14, to the right end of cylinder 23. When the block 11 is shifted to the left poistion, port 13 is transferred in registration with port 15, as shown in FIG. 4, to supply pressure to the left end of the cylinder 23. In the construction shown in FIGS. 1 and 4, the block 11 is dimensioned so when its port 13 is in registration with one of the ports 14, 15, in block 10, the opposite one of the ports is uncovered for exhaust to atmosphere.

It will be apparent, the block 10 may be provided with only one port, as port 14 and accordingly, when the block 11 is shifted to the left position, the port 14 will be uncovered to permit exhaust to the atmosphere. In such an arrangement, the valve would function in a one-way pulsating circuit.

It will be apparent that the blocks 10 and 11 can be provided with many different porting arrangements extending through the confronting surfaces of the blocks. For example, in FIG. 6, the block 111 is formed with a port 112 connected to the conduit 113. It is also formed with ports 114, 115, opening through the confronting surface of the block, the ports 114, 115, communicating with passages 116, 117, respectively, opening to atmosphere through the side of the block.

The block 110 is formed with a pair of ports 120, 121. With the valve positioned, as in FIG. 6, the port 112 is in registration with the port 120. The port 121 of block 110 is in registration with the port 115. It will be apparent that the ports 115, 116, may be connected to other operating elements instead of opening to the atmosphere.

As previously referred to, an advantage of my valve structure resides in the fact that fluid escapes through the ports during the intermediate portion of the arcuate movement of the movable block, maintaining the mating surfaces clean and free from any accumulation of dust, etc. It is also pointed out that this arrangement provides a fluid cushion between the blocks whereby, at each end of the arcuate movement, there is no hammer action between the blocks. Accordingly, the confronting mating surfaces have practically infinite life expectancy.

Where the blocks are formed with flat planar confronting surfaces, the valve can be fabricated from flat stock without the necessity of any precision machining. Any wear occurring in the pivotal connections does not adversely affect the operation of the valve inasmuch as the confronting surfaces are always drawn tightly together at each end of the arcuate movement.

What I claim is:

1. A valve for a pneumatic circuit comprising a pair of blocks, each of said blocks having a linear surface, said blocks being arranged with their linear surfaces in confronting relation, block connecting means operable upon relative movement between said blocks in a direction lengthwise of said linear surfaces to move the confronting surfaces of said blocks out of contact by imparting limited arcuate movement of the linear surface of one block relative to the linear surface of said other block, and drawing said surfaces into tight engagement at each end of said arcuate movement, the linear confronting surface of each of said blocks being formed with a port, said ports being connected in said circuit and being arranged in registration at one end of said arcuate movement and out of registration at the opposite end of said arcuate movement.

2. A valve as defined in claim 1, wherein said block connecting means consists of linkage pivotally connected to said blocks at points located at opposite sides of the plane extending between said confronting surfaces, the axes of said pivoted connections extending in a direction transversely of said linear surfaces.

3. A valve as defined in claim 2, wherein said linear confronting surfaces are planar flat surfaces.

4. A valve as defined in claim 2, wherein the confronting surface of one of said blocks is formed with a single port and the confronting surface of said other block is formed with a pair of spaced apart ports, said single port being arranged in registration with a port of said pair at each end of said arcuate movement.

5. A valve as defined in claim 1, wherein the linear confronting surfaces of one of said blocks is of concave form in a direction transversely of said surface and the linear confronting surface of said other block is of complemental convex form.

6. A valve comprising a pair of blocks formed with confronting linear mating surfaces, link means arranged at opposite sides of said blocks, like ends of said link means having a pivotal connection to said blocks respectively, said pivotal connections being located at opposite sides of the plane extending intermediate said confronting linear surfaces, the axes of said pivotal connections extending in a direction transversely of said surfaces, said link means being operable upon relative movement between said blocks to impart limited arcuate movement of the confronting surface of one block relative to the confronting surface of said other block, and to draw said surfaces into tight engagement at each end of said arcuate movement, said confronting surfaces being formed with ports, certain of said ports being aligned in registration at one end of said arcuate movement, and other of said ports being aligned in registration at the opposite end of said arcuate movement, and valve actuating means operatively connected to said links for effecting pivotal movement thereof.

7. A valve as defined in claim 6, and including means imparting operating motion to said link means about said pivotal connections.

8. A valve as defined in claim 6, said link means including an over-the-center structure.

References Cited
UNITED STATES PATENTS

| | | | |
|---|---|---|---|
| 2,025,188 | 12/1935 | Wilson | 251—300 X |
| 2,703,101 | 3/1955 | Cantwell | 251—75 X |
| 2,752,945 | 7/1956 | Patterson et al. | 137—625.2 |
| 2,800,926 | 7/1957 | Handley | 251—203 X |
| 2,823,888 | 2/1958 | Wynn | 251—203 X |
| 3,200,844 | 8/1965 | Jackson | 251—75 X |

M. CARY NELSON, Primary Examiner

M. O. STURM, Assistant Examiner

U.S. Cl. X.R.

251—75